Figure 1:
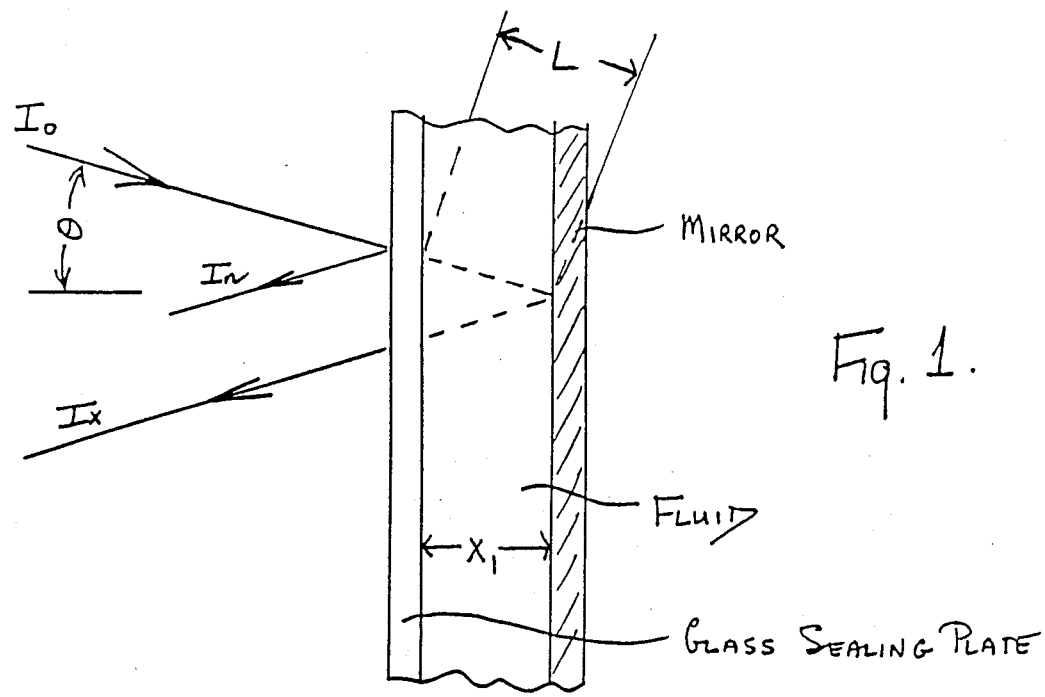

United States Patent [19]

Lynam et al.

[11] Patent Number: 4,917,824
[45] Date of Patent: Apr. 17, 1990

[54] FLUID LIGHT CONTROLLING MEDIUM FOR A VEHICLE REARVIEW MIRROR

[75] Inventors: Niall Lynam, Holland, Mich.; Keith W. Molyneux, Willow Glen, Ireland

[73] Assignee: Donnelly Mirrors Limited, Naas, Ireland

[21] Appl. No.: 146,838

[22] Filed: Jan. 22, 1988

[51] Int. Cl.$^4$ ................................................ G02B 5/24
[52] U.S. Cl. ..................................... 252/582; 350/266
[58] Field of Search ............... 350/266, 267, 268, 277, 350/312, 642; 252/582 A, 582 P, 582 S

[56] References Cited

U.S. PATENT DOCUMENTS

| | | | |
|---|---|---|---|
| 3,000,262 | 9/1961 | Rabinow et al. | 350/279 |
| 3,039,349 | 6/1962 | Rodgers | 88/1 |
| 3,198,070 | 8/1965 | Platzer, Jr. et al. | 350/267 |
| 3,233,515 | 2/1966 | Platzer, Jr. et al. | 350/267 |
| 3,509,063 | 4/1970 | Teague et al. | 252/600 |
| 3,639,251 | 2/1972 | Wurm | 350/312 |
| 3,860,425 | 1/1975 | Ono et al. | 96/82 |
| 4,054,374 | 10/1977 | Craig | 350/267 |
| 4,680,103 | 7/1987 | Beilin et al. | 350/362 |
| 4,693,558 | 9/1987 | Nakaho et al. | 350/642 |

FOREIGN PATENT DOCUMENTS 2191602A of 0000 United Kingdom .

Primary Examiner—Mary C. Lee
Assistant Examiner—Catherine S. Kilby Scalzo
Attorney, Agent, or Firm—Price, Heneveld, Cooper, DeWitt & Litton

[57] ABSTRACT

A fluid composition for use in a rearview mirror of the type which contains a U.V. stable fluid light controlling medium, the composition consisting of a solvent, e.g., propylene carbonate, with a freezing point less than $-30°$ C. and a boiling point greater than 80° C., a dye or mixture of dyes, e.g., a 1,2-chrome dye and a phthalocyanine dye, which is soluble in the solvent and optionally a U.V. stabilizing agent, e.g., a benzophenone, benzotriazole or organo-nickel complex, which is also soluble in the solvent. The dye or mixture of dyes has specifically defined light absorbance characteristics and in use is a fluid which is nontoxic, easy to handle, has a relatively high flash point, and is relatively inert to glass, rubbers and plastics.

6 Claims, 1 Drawing Sheet

U.S. Patent

Apr. 17, 1990

4,917,824

FLUID LIGHT CONTROLLING MEDIUM FOR A VEHICLE REARVIEW MIRROR

BACKGROUND OF THE INVENTION

This invention relates to a composition for use in a rearview mirror of the type containing a fluid light controlling medium. More particularly, the invention relates to a fluid composition for use in a vehicle rearview mirror of the day-night type, which utilizes an optically dense light attenuating fluid in the night position of the mirror capable of inhibiting glare and which will diminish or block out reflections of the mirror so as to avoid double images hazardous to driving at night.

Three components are common to known fluid controlling media for use in rearview mirrors, namely (a) a carrier fluid, (b) a light absorbing medium, and (c) optionally a stabilizing medium. The three components can conceptually form several types of fluid and more particularly an emulsion, a solution or suspension. Of the possible fluid types it would be expected that a solution would be the most stable over long periods of time viz periods of time in the region of ten years.

Rearview mirrors containing a fluid light controlling medium are known, for example, from U.S. Pat. Nos. 3,198,070 and 3,233,515. U.S. Pat. No. 3,198,070 recommends the use of a colloidal suspension of fine carbon black particles dispersed with the aid of rubber molecules in kerosene or comparable solvent. However, the colloidal suspension is not U.V. stable and furthermore staining of the glass and mirror components of a rearview mirror containing such a suspension is observed. In U.S. Pat. No. 3,233,515 the fluid medium is described as "an opaque optical fluid" such as that described in concurrently filed U.S. Application Ser. No. 156,535.

To date, we are unaware of any rearview mirror containing a fluid light controlling medium in the form of a solution.

Studies carried out by us have indicated that factors pertinent to the selection of the carrier fluid for a rearview mirror of the day-night type, which utilizes an optically dense light attenuating fluid, include (not in order of priority) viscosity, vapor pressure, the temperature coefficient of viscosity and vapor pressure, boiling and melting points, flash point, surface tension, U.V. stability, solubility characteristics, chemical inertness, cost toxicity, refractive index and aeration. U.S. Pat. No. 3,198,070 recognizes that preferably the fluid should be stable over a wide range of temperatures viz $-30°$ F. to $200°$ F. ($-23°$ C. to $93°$ C.). However, as indicated above, in addition to temperature stability, other very pertinent factors include viscosity, U.V. stability, chemical inertness and toxicity.

It is an object of the present invention to provide an anti-glare, day-night mirror which incorporates a stable, optically dense fluid which prevents transmission of light to and from the surface of the mirror at night an thus reduces glare to a minimum.

Accordingly, the invention provides a fluid composition for use in a rearview mirror of the type containing a U.V. stable fluid light controlling medium, said composition comprising:

(a) a carrier fluid consisting of a solvent or solvent mixture having a freezing point $\leq -30°$, a boiling point $\geq 80°$ C., and a viscosity within $5°$ C. of the freezing point thereof of up to 50 centipoise;

(b) a light absorbing medium soluble in the carrier fluid and consisting of a dye or mixture of dyes, said dye or mixture of dyes remaining in solution at a temperature below $-30°$ C. and having an absorbance characteristic when combined with the other fluid components according to Beer-Lambert's Law:

$$I_x = I_o e^{-\alpha c x}$$

wherein
$I_x$ = intensity of illumination after traveling through the fluid;
$I_o$ = initial intensity of illumination;
$\alpha$ = average absorbance coefficient of the dye or dye mixture in the visible range of radiation;
$c$ = concentration of the dye or dye mixture;
and $x$ = light pathlength through the light absorbing medium such that $$\alpha c x = A$$

where A has a value in the range 0.05 to 11.0 and where the maximum value of A for the day position of the mirror is 0.28 and where the minimum value of A for the night position of the mirror is 2.00; and
where $x_1$ is the in use fluid thickness and is defined by the equation $$x_1 = L \cos \theta$$

in which 2L is the pathlength of the light through the fluid and $\theta$ is the angle at which the incident light strikes the mirror; and $x = 2L$; and (c) optionally a U.V. stabilizing agent.

Preferably, the freezing point of the solvent or solvent mixture is $\leq 40°$ C. and the boiling point of the solvent or solvent mixture is $\geq 120°$ C.

A preferred solvent is propylene carbonate and a preferred solvent mixture is propylene carbonate/ethanol.

Apart from the essential features of the carrier fluid specified hereinabove, the fluid should be nontoxic, easy to handle and have a relatively high flash point. Furthermore, the fluid should be relatively inert to glass, a range of rubbers, and plastics and other engineering materials, such as steel, used in the construction of a rearview mirror. The carrier fluid should preferably be relatively U.V. stable and a low vapor pressure is also advantageous. A further preferred characteristic of the carrier fluid is a refractive index which is similar to that of commercial glass. The carrier fluid must also obviously have the ability to dissolve the dye o dye mixture and the U.V. stabilizing agent, if present.

Preferred dyes include azo, anthraquinoid, phthalocyanine and 1,2-chrome complex dyes and mixtures thereof The dye must remain in solution over the temperature range specified for the solvent or solvent mixture. The dye must have a long period of light fastness and be capable of remaining in solution over several years without fading. Specifically, the dye must be completely soluble in the solvent or solvent mixture and should be capable of remaining in solution in the solvent or solvent mixture for a period of approximately ten years under extreme conditions. The dye or dye mixture is preferably relatively U.V. stable.

The dye or dye mixture should be fairly uniform and optically dense in the visible region of the spectrum, with greatest density in the region with the highest product of eye sensitivity and automobile headlight intensity.

In particular, a preferred dye mixture has been found to be a mixture of Lampronol Black BR and Savinyl Blue GLS in a ratio of 0.6:1 by weight as hereinafter described in the Example. Lampronol and Savinyl are trademarks.

In addition to the light absorbing medium remaining in solution in the solvent or solvent mixture over a period of, for example, ten years, it must also remain optically intact, which may involve the use of a U.V. stabilizing agent.

Examples of suitable U.V. stabilizing agents are benzophenones, benzotriazoles or organo-nickel complexes. A preferred stabilizing agent is Cyasorb U.V. 5411 (Cyasorb is a trademark of the American Cyanamid Company). The primary job of the stabilizing agent is to give U.V. stability. Several U.V. stabilizing agents may be used so that all possible stabilizing mechanisms are exploited to the full, for example, absorption and scavenging.

The products of U.V. degradation of the dye or carrier fluid should be nonaggressive to components of the fluid or the mirror and should remain soluble.

Other constraints to those mentioned above in selecting a suitable dye for use in the composition according to the invention, include the fact that the dye should not stain the glass sealing plate or the mirror or mirror glass. Furthermore, the constituent particles of the dye must not agglomerate. Other factors which must be considered are the aesthetic appearance of the mirror and cost factors.

A solution of the dye or dye mixture in the solvent or solvent mixture should give an optically dense fluid over the visible spectrum using a short pathlength (circa 2 to 4 mm).

The composition according to the invention is suitable for use in interior or exterior vehicle rearview mirrors of the type referred to. Specifically, the composition according to the invention is used as the optically dense light attenuating fluid which is used in the night position of a day-night rearview mirror, to provide a layer of nonreflecting opaque fluid between the mirror and a clear glass sealing plate. The composition according to the invention can be used with any such day-night rearview mirror, but especially with the day-night rearview mirrors of the type described in U.S. Pat. Nos. 3,198,070 and 3,233,515. The composition according to the invention is particularly suited for use with the rearview mirror of our co-pending European Pat. Application No. 85309063.7 (0186391).

As stated above, propylene carbonate is especially suitable for use as the carrier fluid in a day-night mirror of the type referred to. A list of the physical properties of propylene carbonate illustrating its suitability are listed in Table 1.

The temperature dependence of vapor pressure for propylene carbonate is such (see Table 1) that the boiling/melting range is exceptionally wide; 242° C. to −49° C. The temperature dependence of viscosity (see Table 1) is modest. Furthermore, propylene carbonate has a room temperature vapor pressure of 0.03 mm Hg at 20° C. which is particularly low. Furthermore, with a polarity index of 6.2 (compared with, for example, water at 10.2 and pentane at 0.0), propylene carbonate is a good solvent for many dye systems. Furthermore, U.V. stabilizers such as benzophenones, benzotriazoles and organo-nickel complexes are also all readily soluble in propylene carbonate.

Since vapor pressure (and its temperature dependence) is exceptionally low for propylene carbonate, the potential for vapor buildup is reduced. The viscosity of propylene carbonate (and its dependence on temperature) is low, hence fluid movement and thus mirror response is rapid across a wide temperature range.

The refractive index of 1.421 at 20° C. is close to that of soda lime glass (1.52) and hence helps to reduce secondary reflections. Propylene carbonate shows a sharp U.V. cut-off at 280 nm which helps to shield dissolved dyes. The cubic coefficient of expansion of 0.00096 cc/cc/° C. is modest. Propylene carbonate cools easily and remains liquid at temperatures as low as −80° C. for a period of several months.

Other properties of propylene carbonate relevant to its use as a solvent in the compositions of the present invention are that it is a relatively inert solvent with a pH of 6.4. It is considered practically nontoxic (L.D. 29 g/Kg when administered orally to rats). It is almost odorless. Splashes of propylene carbonate to the eyes can be painful. It is not a skin poison but can be painful if it enters an open wound, similar to a disinfectant. There are no special requirements for storage or handling. The flash point is high for an organic solvent (132° C.) compared to −17° C. for petroleum spirits. It has an auto-ignition temperature of 510° C. Fires can be extinguished with water, carbon dioxide, dry powder, foam or vapor liquids.

Accordingly, it will be appreciated that propylene carbonate is particularly suited for use as a solvent in the composition according to the present invention.

At low temperature (−30° C.) the viscosity of propylene carbonate is approximately 20 centipoise. Accordingly, in order to ensure an improved viscosity, addition of a solvent such as methanol, ethanol, isopropanol, 1-butanol, 2-pentanol, n-amyl alcohol, isoamyl alcohol, acetone, methyl ethyl ketone, methyl isobutyl ketone, gamma butyrolactone, anisole, p-cymene, dimethyl formamide and amyl acetate may be used. For example, a significantly lower viscosity will be obtained by using propylene carbonate and ethanol in an amount of 80:20 v/v.

The invention will be further illustrated by the following Example.

EXAMPLE

A solution of Lampronol Black BR (marketed by Imperial Chemical Industries PLC) and Savinyl Blue GLS (marketed by Sandoz U.K. Limited) in a ratio of 0.6:1 by weight and at a concentration of 1.7 g/l in propylene carbonate was prepared. The ratio of the two dyes and the concentration were selected so as to permit the use of a fluid thickness in the mirror of 1.5 mm. Lampronol Black BR is classified as a 1,2-chrome complex, whereas, Savinyl Blue GLS is a phthalocyanine dye.

To determine their suitability as a dye mixture for use as a light absorbing medium in the composition according to the invention, transmission studies were carried out for Lampronol Black BR and Savinyl Blue GLS and the results of these studies are given in Table 2 and Table 3, respectively. In each case the studies were carried out on a solution of the dye having a concentration of 1.0 g/l propylene carbonate.

The solution of the dye mixture was found to be optically dense in situ over much of the visible spectrum.

Cyasorb U.V. 5411 (4 g/l) was added to the dye solution to render the solution U.V. stable.

A suitable volume of the dye/propylene carbonate solution thereby prepared was filled into a mirror of the type described in our co-pending Pat. Application No. 3210/84 and was successfully used as an anti-glare, day-night rearview mirror in experimental trials. No staining of the glass was observed.

Figure 2:
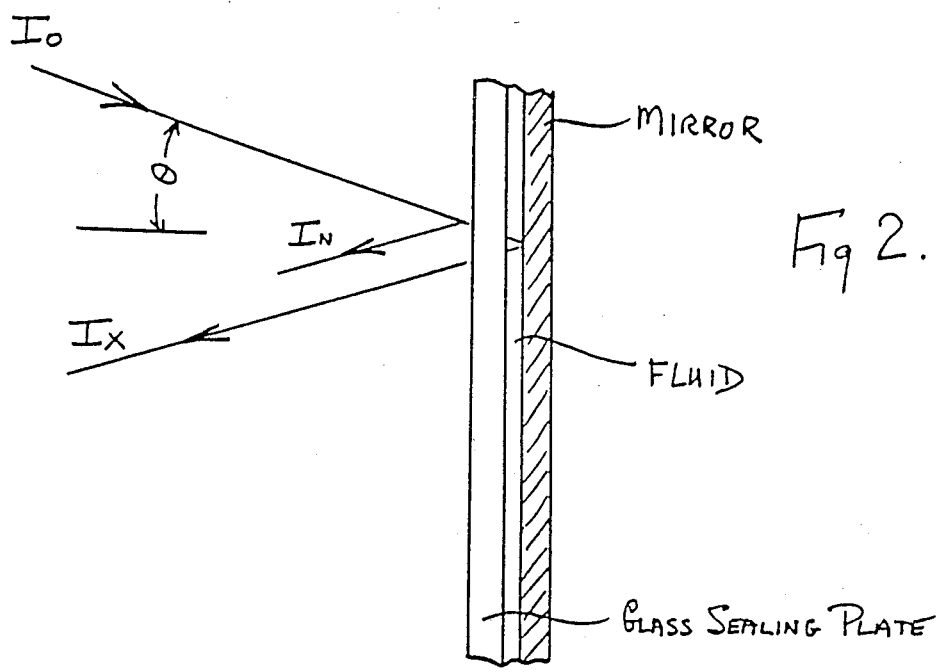

Reference is now made to the accompanying drawings in which:

FIG. 1 illustrates diagrammatically the pathlength of the light through the fluid and the primary reflections of the light with the mirror in the night position; and FIG. 2 is a similar diagrammatic illustration to FIG. 1 but with the mirror in the day position.

While the accompanying drawings are to a large extent self-explanatory it will be noted that the pathlength of the light is 2L where $L = \cos\theta$ and $L \geq x$, $x$ being the thickness of the fluid and $\theta$ the angle at which the light strikes the mirror.

In a preferred embodiment of the invention the glass sealing plate and the fluid have matched refractive indices in order to ensure that secondary reflections at the glass/fluid interfaces are negligible. In the night position $I_n = 4\%\ I_o$ approximately and $I_x = 0.4\%\ I_o$ approximately. In the day position $I_n = 4\%\ I_o$ approximately, while $I_x$ is a large proportion of $I_o$, generally of the order of 70%. In the night position the fluid will absorb of the order of 96% of the light, while in the day position the fluid will absorb a small proportion of the light, generally less than 10%. Thus, in the day position $I_x$ is dominant and in the night position $I_n$ is dominant. This maximizes the driver's daytime visibility, reduces glare to an acceptable level at night and renders secondary reflections negligible. After a period of use the fluid does experience a degree of U.V. degradation, but not to a degree sufficient to render the fluid nonfunctional within the operational parameters previously outlined.

TABLE 1

PROPYLENE CARBONATE PHYSICAL PROPERTIES

|  |  | Propylene Carbonate |
|---|---|---|
| Boiling point, °C. (760 mm) |  | 241.7 |
| Coefficient of expansion, cc/cc/°C. |  | 0.00096 |
| Dielectric constant, 25° C. esu |  | 69.0 |
| Density, lb/gal |  | 10.05 (20° C.) |
| Fire point, °F. |  | 280 |
| Flash point (PMCC), °F. |  | 275 |
| Freezing point, °C. |  | −49.2 |
| Heat of fusion, cal/g |  | 18 |
| Heat of combustion, gal/g |  | 3,396 |
| kcal/mol |  | 347 |
| Heat of vaporization, cal/mol, | 150° C. | 13,200 |
|  | 175° C. | 12,600 |
|  | 200° C. | 12,200 |
|  | 230° C. | — |
|  | 240° C. | 11,900 |
|  | 248° C. | — |
| Pour point, °F. |  | −100 |
| Refractive index |  | 1.4210 ($n_D^{20}$) |
| Specific gravity |  | 1.2057 (20/4° C.) |
| Specific heat, cal/g, | 50° C. | 0.375 (25° C.) |
|  | 100° C. | 0.438 |
|  | 150° C. | 0.480 |
| Thermal conductivity at 41° C., |  |  |
| BTU/(hr) (ft$^2$) (°F./ft) |  | 0.12 |
| cal/(sec) (cm$^2$) (°C./cm) |  | 49.6 × 10$^{-5}$ |
| Viscosity, cs., | −65° F. | 57.6 |
|  | −40° F. | 19.4 |
|  | 0° F. | 6.64 |
|  | 100° F. | 1.67 |
|  | 210° F. | 0.78 |

TABLE 2

DETERMINATION OF THE PERCENTAGE TRANSMISSION FOR A SOLUTION OF LAMPRONOL BLACK BR (1.0 g/l) OVER THE VISIBLE SPECTRUM

| Wavelength | % Transmission |
|---|---|
| 340 | 0.5 |
| 350 | 0.5 |
| 360 | 0.5 |
| 370 | 0.5 |
| 380 | 0.5 |
| 390 | 0.5 |
| 400 | 0.5 |
| 410 | 0.5 |
| 420 | 1.0 |
| 430 | 1.5 |
| 440 | 2.0 |
| 450 | 2.0 |
| 500 | 2.0 |
| 550 | 1.0 |
| 600 | 1.0 |
| 650 | 3.0 |
| 700 | 67.0 |

(Pathlength used = 1 mm)

TABLE 3

DETERMINATION OF THE PERCENTAGE TRANSMISSION FOR A SOLUTION OF SAVINYL BLUE GLS (1.0 g/l) OVER THE VISIBLE SPECTRUM

| Wavelength | % Transmission |
|---|---|
| 350 | 0.00 |
| 360 | 0.00 |
| 370 | 3.00 |
| 380 | 9.00 |
| 390 | 25.00 |
| 400 | 43.00 |
| 410 | 58.00 |
| 420 | 69.00 |
| 430 | 80.00 |
| 440 | 88.00 |
| 450 | 91.00 |
| 500 | 87.00 |
| 550 | 33.00 |
| 600 | 1.00 |
| 650 | 0.25 |
| 700 | 11.00 |

(Pathlength used = 1 mm)

The embodiment of the invention in which an exclusive property or privilege is claimed are defined as follows:

1. A fluid composition for use as a light attenuating medium in a rearview mirror consisting essentially of:
    (a) a carrier fluid, the major component of which is propylene carbonate, such that said carrier fluid has a freezing point $\leq -30°$ C., a boiling point $\geq 80°$ C., and a viscosity within 5° C. of the freezing point thereof of up to 50 centipoise;
    (b) a light absorbing dye in solution, rather than in dispersion, in said carrier fluid consisting of an azo, anthraquinoid, phthalocyanine or 1,2-chrome dye or a mixture of two or more thereof, said dye or mixture of dyes remaining in solution at a temperature below $-30°$ C. and having an absorbance characteristic when combined with the other fluid components according to Beer-Lambert's Law:

$$I_x = I_o e^{-\alpha c x}$$

wherein $I_x$ = intensity of illumination after-traveling through the fluid;

$I_o$ = initial intensity of illumination;

$\alpha$ = average absorbance coefficient of the dye or dye mixture in the visible range of radiation;

$c$ = concentration of the dye or dye mixture; and $x$ = light pathlength through the light absorbing medium such that $\alpha c x = A$ where A has a value in the range 0.05 to 11.0 and where the maximum value of A for the day position of the mirror is 0.28 and where the minimum value of A for the night position of the mirror is 2.00; and (c) a U.V. stabilizing agent in solution in said carrier fluid which is a benzophenone, benzotriazole or organo-nickel complex.

2. A fluid composition as claimed in claim 1 wherein the solvent or solvent mixture has a freezing point $\leq -40°$ C. and a boiling point $\geq 120°$ C.

3. A fluid composition as claimed in claim 1 wherein the dye comprises a mixture of Lampronol Black BF and Savinyl Blue GLS in a ratio of 0.6:1 by weight.

4. A fluid composition as claimed in claim 1 wherein the U.V. stabilizing agent comprises Cyasorb U.V. 5411.

5. A fluid composition as claimed in claim 1 wherein the carrier fluid additionally includes a minor amount of one or more of the following solvents: methanol, ethanol, isopropanol, 1-butanol, 2-pentanol, n-amyl alcohol, isoamyl alcohol, acetone, methyl ethyl ketone, methyl isobutyl ketone, gamma butyrolactone, anisole, p-cymene, dimethyl formamide and amyl acetate.

6. The fluid composition of claim 1 in which said dye is a mixture of a 1,2-chrome complex and a phthalocyanine dye in a ratio of 0.6:1 by weight.

* * * * *

UNITED STATES PATENT AND TRADEMARK OFFICE
CERTIFICATE OF CORRECTION

PATENT NO. : 4,917,824
DATED : April 17, 1990
INVENTOR(S) : Niall Lynam and Keith W. Molyneux It is certified that error appears in the above-identified patent and that said Letters Patent is hereby corrected as shown below:

Column 1, lines 34 and 35:

After "fluid" delete --such as that described in concurrently filed U.S. Application Serial No. 156,535--.

Column 2, line 51:

"dye o" should be --dye or--.

Column 2, line 55:

After "thereof" insert --.--.

Column 5, line 21:

"L = Cos θ" should be --$L = \frac{x}{\cos \theta}$--.

Column 5, line 21:

"$\geqq$" should be --$\geq$--.

Signed and Sealed this

Twenty-seventh Day of August, 1991

Attest:

HARRY F. MANBECK, JR.

*Attesting Officer*   *Commissioner of Patents and Trademarks*